United States Patent Office 2,777,764
Patented Jan. 15, 1957

2,777,764

PROCESS OF RECOVERING PRECIOUS METALS FROM REFRACTORY SOURCE MATERIALS

Norman Hedley and Howard Tabachnick, Stamford, Conn., assignors to American Cyanamid Company, New York, N. Y., a corporation of Maine No Drawing. Application July 9, 1954, Serial No. 442,454

19 Claims. (Cl. 75—105)

This invention relates to a process for the recovery of locked precious metals from refractory sources. More specifically, it relates to a process of recovering locked precious metals from refractory sources which comprises slurrying said refractory source of said precious metals in a non-alkaline aqueous medium, heating said slurry under pressure to 120–330° C. in the presence of an oxidizing agent, separating the undissolved matter and recovering the precious metal in the undissolved matter by cyanidation.

The recovery of precious metals from ores by cyanidation is a process known in the art. It is used widely, especially in the recovery of gold and silver. While it is a very effective method of recovering these precious metals, it has been known for a long time that with certain types of ores, this method is not usable. In these types of ores, the precious metal is occluded in another mineral in such a manner that the cyanide solution cannot contact the precious metal to dissolve it. Such occluded precious metals are said to be locked and these ores are spoken of as refractory ores. These refractory ores are those which contain sulfur, arsenic, selenium, antimony, tellurium or carbonaceous matter. They include such important minerals as pyrite and arsenopyrite.

Recovery of the precious metal from these ores by a method of physically grinding in order to permit the cyanide solution to contact the precious metal is not economical and in addition, only a fraction of the precious metal contained therein can be recovered by this method. In the past, it has been customary to roast such ores in order to convert the sulfides, arsenic compounds, selenides, antimony compounds, tellurides and the like, into oxides. Some of these oxides are volatile and escape the reaction mixture in this manner. Others are now porous and more easily penetrable, permitting the cyanide to attack the precious metal.

Even this calcining process has strong disadvantages. First of all, the temperature must be controlled rather carefully. If the temperature gets too high, the oxides which are being formed tend to fuse and reocclude the precious metal. If the temperature is not high enough, there is incomplete conversion of the locked ore into an oxide ore with resulting loss of precious metal still locked therein.

This method has been used over a long period as the only way in which this type of ore could be attacked. However, the difficulties enumerated above have resulted in tailings from such workings which still contain significant amounts of precious metals. These tailings have accumulated in large quantities in a great many mining operations and have been held in the hope that a good method of working them up would be discovered. Such tailings form another of the refractory source for precious metals which serve as a starting material for our invention.

There has recently appeared in the art a method of oxidizing ores of copper, zinc, cobalt, and nickel and the like, under pressure and high temperature, in order to dissolve these base metals without need of smelting. However, such a process will not result in getting any precious metals present in solution. It is one of the advantages of our invention that we have found how this new metallurgical technique can be used to great advantage on sources of precious metals which methods of the prior art could not satisfactorily work up.

We have found that it is possible to recover precious metals from either their ores, or concentrates, or from the tailings of roasted and leached ores, in any one of which the precious metal is locked. The method consists in pre-treating the said locked source material for precious metal in a non-alkaline oxidizing medium under pressure, at a high temperature, separating the undissolved matter, and recovering the precious metal in the undissolved matter by various customary means, such as cyanidation.

This method is operable with any precious metal ore, but where cyanidation will directly attack the precious metal it is often not economic. Refractory sources in which the precious metal is locked or occluded, however, can be worked up satisfactorily only by this treatment, and the present invention is particularly advantageous with these sources. Such refractory sources consist of, for example, ores or concentrates in which the precious metals are intimately associated with pyrite and arsenopyrite, or contain arsenical or antimonial compounds, or contain telluride minerals, or contain carbonaceous materials. They also consist of calcined materials which have resulted from the heat treatment of precious metal-bearing materials. These latter may or may not have been already subjected to cyanidation but still contain considerable amounts of precious metals, which have failed to respond to such cyanidation.

In the practice of our invention, a slurry of the ore concentrate or calcine is made in an aqueous liquor, preferably one containing some sulfuric acid. This is then subjected to oxidation at elevated temperature and pressure. The precious metal-bearing minerals, concentrates, or calcines are thus decomposed and the physically or chemically locked precious metals are liberated. The oxidized slurry is discharged and cooled, filtered or thickened, and washed. The washed residue is then treated with an alkaline cyanide solution until the precious metals are dissolved, after which the pulp is filtered and washed. The precious metals in the filtrate are recovered by any of the usual methods.

The aqueous medium in which the pressure oxidation of the refractory source material for precious minerals is carried out is described in this specification as non-alkaline. By this, it is meant that it may be either substantially neutral or acid. The oxidation of these ores and other materials gradually produces increased amounts of acid. The process operates quite satisfactorily if an unacidified aqueous slurry is charged and oxidized. However, the reaction is slow to start until some acid has formed. It is preferred that a small amount of acid be included in the aqueous medium in order to catalyze the beginning of the reaction. The acid can be any moderate or strong mineral acid which tends to decompose ore sulfides. Because of its cheapness and availability, sulfuric acid is preferred. However, nitric, phosphoric, hydrochloric, hydrobromic and similar acids are equally usable. Strong organic acids such as trichloroacetic acid and the like, especially when they are somewhat resistant to oxidation can also be used to start the reaction, but because of the higher cost, they are not so economically useful. It is preferred that between 1 and 5% acid solution be used as the aqueous medium for the pressure oxidation.

In the performance of our invention oxidizing conditions are necessary during the pressure treatment. Any oxidizing agent can be present in the reaction. However, the pressure oxidation consumes large quantities of such oxidizing agent. While it is possible to use such oxidizing agents as hydrogen peroxide, alkali metal permanganate, sodium dichromate and the like, the cost of these oxidizing agents makes them less attractive. By far the cheapest and preferred oxidizing agent is air or compressed oxygen and these form the preferred species to be used. It is desirable that the pressure reaction be carried out in a strongly oxidizing medium and that sufficient oxidizing agent be supplied to oxidize relatively completely all the minerals which are occluding the precious metals. The nature of the oxidizing agent is far less important than that it be present in sufficient quantity.

The autoclaving is carried out above 120° C. Higher temperatures provide speedier oxidation and therefore consume much less oxidizing agent. It is therefore preferred, usually, to carry out the autoclaving at a much more elevated temperature, such as about 330° C. The pressure may be the vapor pressure of water at the temperature used or further pressure can be supplied by adding oxygen or air under pressure. The reaction occurs best if pressures over 100 p. s. i. g. are used.

The reactions in the autoclave produce much acid. Since cyanidation operations must be kept alkaline, the acid produced in the autoclaving introduces a problem of lime consumption in the subsequent cyanidation. The product of the autoclaving can sometimes be washed reasonably free of acid before cyanidation, and this can keep the alkalizing problem to a minimum. In such cases high temperatures such as 320° C. are preferred. However, in other cases, such washing is not efficient or else consumes so much water as to be quite uneconomical. In addition, some of the insoluble products of the acid oxidation consume more lime than others. Apparently the temperature at which the autoclave reaction was carried out affects the alkali consuming nature of insoluble products formed. In these cases another embodiment of our invention assumes importance.

We have further found that the consumption of lime in the cyanidation process can be greatly reduced by controlling the autoclaving temperature to between 150 and 250° C. while keeping the pressure in the preferred range, near 650 p. s. i. g., by supplying additional oxygen or air to the autoclave. A temperature of about 175°–200° C. is preferred for arsenical concentrates with slightly higher temperatures better for antimonial concentrates. Under such conditions it is possible to save as much as 300 pounds of lime per ton of concentrate. Where the nature of the locked source material is such that the autoclaved pulp cannot be efficiently or economically washed, the use of this lower temperature range shows great economic advantages. The cost of large quantities of lime, especially when the consumer is located great distances from the source of such material, is a major factor.

The precious metals which occur most frequently in a locked form in a refractory source material are gold and silver. However, the other precious metals such as platinum, osmium, iridium, palladium and the like also sometimes occur in similar form and our invention is equally usable with them. Thus any precious metal which will not dissolve in an acid-oxidizing medium but which will dissolve on cyanidation can readily be used in the process of our invention. The wide applicability of this process for the extraction of precious metals from refractory ores and similar sources can be seen from the following wide variety of materials to which it can be successfully applied. The following table gives the assay and analysis of six representative samples of this type of material:

|  | Sample 1 | Sample 2 | Sample 3 | Sample 4 | Sample 5 | Sample 6 |
|---|---|---|---|---|---|---|
| Gold, oz./ton | 0.404 | 4.63 | 0.82 | 6.25 | 5.40 | 1.56 |
| Silver, oz./ton |  | 1.76 |  | 2.51 | 1.07 | 0.18 |
| Iron, percent | 2.94 | 23.49 |  | 22.20 | 20.57 | 29.26 |
| Sulfur, percent | 5.19 | 19.08 |  | 23.78 | 31.49 | 27.01 |
| Arsenic, percent | 7.17 | 9.41 |  |  | 3.75 | 15.35 |
| Antimony, percent |  |  |  |  | 28.42 | 0.79 |
| Nickel, percent |  | 0.59 |  |  |  |  |
| Copper, percent |  | 0.155 |  |  |  |  |
| Zinc, percent |  | 0.055 |  | 0.27 |  |  |
| Tellurium, percent |  | 0.52 |  | Present |  |  |
| Insolubles, percent | 68.46 |  |  | 44.76 | 4.16 | 16.88 |
| Carbon, percent | 1.80 |  |  |  |  |  |
| Manganese, percent |  |  |  | 0.20 |  |  |

These samples can be described as follows:

*Sample 1.*—A gold ore from Nevada containing the minerals realgar ($As_2S_2$), orpiment ($As_2S_3$), pyrite ($FeS_2$), quartz, and carbonaceous material.

*Sample 2.*—A flotation concentrate from Canada high in sulfides. The chief minerals are arsenopyrite, pyrite, with smaller amounts of stibnite, sphalerite, and nickel mineral.

*Sample 3.*—The residue left after roasting and cyaniding Sample 2. Consists mostly of ferric oxide ($Fe_2O_3$).

*Sample 4.*—A flotation concentrate from Colorado in which the gold occurs chiefly in the form of tellurides. Other minerals are pyrite and quartz.

*Sample 5.*—An antimony flotation concentrate from Southern Rhodesia. The chief mineral is berthierite ($FeS \cdot Sb_2S_3$), with some arsenopyrite and pyrite.

*Sample 6.*—An arsenic flotation concentrate from Southern Rhodesia. The chief mineral is arsenopyrite, with a minor amount of berthierite.

Our invention can be described by the following examples in which the use of our invention is compared to processes previously known and in which parts are by weight unless otherwise specified.

EXAMPLE 1

A charge of Sample 1 was ground until 80% passed through a 200 mesh screen and cyanided 24 hours at a pulp density of 25% solids in an alkaline cyanide solution. The pulp was then filtered and washed. The residue and the solution were assayed for gold content, and the gold extraction was calculated with the following results:

Gold extraction _____ 66.3%
Gold in residue _____ 0.138 oz./ton.
Sodium cyanide consumption _____ 15.1 lb./ton of ore.

EXAMPLE 2

A charge of Sample 1 was subjected to acid-oxidation in the presence of dilute sulfuric acid, in the proportion of 1 part ore to 3 parts 5% $H_2SO_4$. The slurry was retained in the autoclave for 5½ hours under 840 to 1000 lb. pressure per square inch (water vapor plus supplied oxygen), and at a temperature of 230° C. to 245° C. The slurry was then cooled, filtered, and the residue was washed with water. The washed residue was cyanided for 24 hours at a concentration of 25% solids in alkaline cyanide solution. The pulp was filtered and washed, the residue and filtrate then being assayed for gold content, with the following results:

Gold extraction _____ 91.9%.
Gold in residue _____ 0.031 oz./ton.
Sodium cyanide consumption _____ 0.25 lb./ton.

EXAMPLE 3

A charge of Sample 2, as received, was cyanided for 72 hours in alkaline cyanide solution at a pulp density of 14% solids. The slurry was filtered, washed, and the products were assayed for gold content. From these assays gold extraction was calculated, with the following results:

Gold extraction_____ 59.2%.
Gold in residue_____ 1.86 oz./ton.
Sodium cyanide consumption_____ 4.77 lbs./ton
                                                                                concentrate.

EXAMPLE 4

A charge of Sample 2, as received, was roasted under oxidizing conditions in a muffle furnace for 3½ hours, the finishing temperature being 650° C. The calcine was washed with water to remove soluble salts. The washed calcine was then cyanided for 48 hours according to usual practice. The slurry was filtered and washed and the residue and the solution were assayed for gold content. The amount of gold extracted by the cyanide solution calculated, with the following results:

Gold extraction_____ 86.05%.
Gold in residue_____ 0.82 oz./ton.
Sodium cyanide consumption_____ 0.81 lb./ton
                                                                                concentrate.

EXAMPLE 5

A charge of Sample 2 was subjected to acid-oxidation with dilute sulfuric acid. The slurry consisted of 1 part Sample 2 to 3 parts 5% sulfuric acid. The temperature in the autoclave was 225° C. and the pressure 650 lbs. per square inch (water vapor plus supplied oxygen). The time of the claving was 2 hours. The slurry was then filtered and washed, and the acid-oxidation residue was subjected to cyanidation for 48 hours at a pulp density of 10% solids in an alkaline cyanide solution. The pulp was filtered and washed. The cyanidation residue and the cyanide solution were assayed for gold content, from which results gold extraction was calculated, as follows:

Gold extraction_____ 99.13%.
Gold in residue_____ 0.037 oz./ton.
Sodium cyanide consumption_____ 1.54 lbs./ton
                                                                                concentrate.

EXAMPLE 6

Four parts of Sample 2 and 1 part of Sample 3 were blended. Sample 3, as mentioned previously, is a residue resulting from roasting and cyaniding Sample 2, i. e., in its present form it contains no cyanide-soluble gold. The blend was slurried with dilute sulfuric acid in the proportion 1 part blend to 3 parts 5% sulfuric acid. The slurry was transferred to an autoclave and subjected to 650 lbs. per square inch pressure (water vapor plus supplied oxygen). The temperature was maintained at 223° C. to 248° C. for 3 hours. After cooling, the slurry was filtered and washed. The residue was cyanided for 48 hours at 16% solids in an alkaline cyanide solution. The pulp was then filtered and washed. The residue and the filtrate were assayed for gold content and the percentages of gold extracted from Samples 2 and 3 were calculated with the following results:

Total gold extraction from blend_____ 97.4%.
Gold in blend residue_____ 0.095 oz./ton.
Gold extraction from Sample 2_____ 99.1%.
Gold extraction from Sample 3_____ 62.3%.
Sodium cyanide consumption_____ 9.97 lbs./ton
                                                                                of blend.

EXAMPLE 7

A charge of Sample 4 was treated with an alkaline sodium cyanide solution for 72 hours at a pulp density of 25% solids. The pulp was filtered and washed. The cyanide residue and the filtrate were assayed for gold content and from these assays the gold extracted by cyanide solution was calculated, as follows:

Gold extraction_____ 85.8%.
Gold in residue_____ 0.90 oz./ton.
Sodium cyanide consumed_____ 1.51 lbs./ton.

EXAMPLE 8

A charge of Sample 4 was subjected to acid-oxidation in an autoclave in the presence of dilute sulfuric acid. The slurry consisted of 1 part Sample 4 to 3 parts 5% sulfuric acid. The conditions were 2 hours in the autoclave at 225° C. and 600 lbs. per square inch pressure (water vapor plus supplied oxygen). The slurry was then cooled, filtered and washed. The washed residue was cyanided at a concentration of 20% solids for 48 hours in an alkaline cyanide solution. The pulp was filtered and washed. The cyanide residue and the filtrate were assayed for gold content, and from the results the gold extraction was calculated, as follows:

Gold extraction_____ 99.5%.
Gold in residue_____ 0.03 oz./ton.
Sodium cyanide consumption_____ 0.5 lb./ton.

EXAMPLE 9

A charge of Sample 5, as received, was cyanided for 72 hours in alkaline cyanide solution at 16% solids. The slurry was filtered and washed. The cyanide residue and the solution were assayed for gold content and from the assays the gold extraction was calculated, as follows:

Gold extraction_____ 55.34%.
Gold in residue_____ 2.48 oz./ton.
Sodium cyanide consumption_____ 24.1 lbs./ton.

EXAMPLE 10

A charge of Sample 5, as received, was roasted under oxidizing conditions in a muffle furnace for 3½ hours, the finishing temperature being 650° C. The calcine was ground wet until 60% passed through a 200 mesh sieve. It was then filtered and washed to remove any soluble salts. The washed calcine was then cyanided for 48 hours at a concentration of 16% solids according to the usual practice. The pulp was filtered and washed. The cyanide residue and the solution were assayed for gold content, and the gold extraction was calculated, as follows:

Gold extraction_____ 35.39%.
Gold in residue_____ 3.30 oz./ton.
Sodium cyanide consumed_____ 4.4 lbs./ton.

EXAMPLE 11

A charge of Sample 5 was subjected to acid-oxidation in an autoclave in the presence of dilute sulfuric acid. The slurry consisted of 1 part of Sample 5 to 3 parts of 5% sulfuric acid. The temperature in the autoclave was 225° C. and the pressure 650 lbs. per square inch (water vapor plus supplied oxygen). The time in the autoclave was 2 hours. The slurry was then removed from the autoclave, filtered and washed. The acid-oxidation residue was subjected to cyanidation in alkaline cyanide solution for 48 hours. The pulp was filtered and washed, the residue and solution being assayed for gold content, with the following results:

Gold extraction_____ 98.37%.
Gold in residue_____ 0.089 oz./ton.
Sodium cyanide consumption_____ 1.28 lb./ton.

EXAMPLE 12

A charge of Sample 6, as received, was cyanided for 72 hours in alkaline cyanide solution. The pulp was then filtered and washed. The residue and the filtrate were assayed for gold content and the gold extraction was calculated, as follows:

Gold extraction_____ 17.69%.
Gold in residue_____ 1.27 oz./ton.
Sodium cyanide consumption_____ 5.8 lb./ton.

EXAMPLE 13

A charge of Sample 6, as received, was roasted under oxidizing conditions in a muffle furnace for 3½ hours.

The charge was held at 650° C. for 1½ hours. The calcine was cooled and ground wet for 5 minutes. The pulp was filtered, washed and then subjected to cyanidation in an alkaline cyanide solution for 48 hours. The pulp was filtered and washed. The residue and the solution were assayed for gold content, with the following results:

Gold extraction ---------------------- 71.18%.
Gold in residue ---------------------- 0.435 oz./ton.
Sodium cyanide consumption ---------- 0.93 lb./ton.

EXAMPLE 14

A charge of Sample 6, as received, was subjected to acid-oxidation in an autoclave in the presence of dilute sulfuric acid. The ratio of Sample 6 to 5% sulfuric acid was 1:3. The autoclave conditions were 225° C. and 650 lbs. per square inch (water vapor plus supplied oxygen). The time of contact under these conditions was 2 hours. The slurry was cooled, filtered and washed. The residue was then subjected to cyanidation for 48 hours in alkaline cyanide solution. The pulp was filtered and washed. The residue and the solution were assayed for gold content and the gold extraction calculated, as follows:

Gold extraction ---------------------- 97.85%.
Gold in residue ---------------------- 0.04 oz./ton.
Sodium cyanide consumption ---------- 1.06 lb./ton.

EXAMPLE 15

Sample 2 was treated by various methods to recover the gold by cyanidation.

Cyanidation of this concentrate without pretreatment recovered 59.20% of the gold with the consumption of 4.77 pounds per ton of NaCN equivalent of Aero brand cyanide and 13.54 pounds of CaO.

Sample 2 was subjected to a roast and the resulting calcine cyanided. By this method of treatment 86.05% of the gold was recovered by cyanidation. Reagent consumptions were 0.52 pound of NaCN equivalent of Aero brand cyanide and 5.57 pounds of CaO per ton of concentrate. The cyanide residue assayed 0.82 ounce gold per ton (equivalent to 0.62 ounce per ton of concentrate).

Sample 2 was pulped at 25% solids with 5% sulfuric acid solution in an autoclave and heated to 250° C. with 650 p. s. i. pressure (oxygen plus vapor). Oxygen was added to maintain the 650 p. s. i. operating pressure; contact time was 2 hours. The autoclave product was filtered and washed, repulped, again filtered and washed, and then cyanided. Gold recovery by cyanidation was 99.13%; reagent consumptions were 1.54 pounds of NaCN equivalent of Aero brand cyanide and 362.8 pounds of CaO per ton of concentrate.

Four additional tests were completed in which all autoclave conditions except temperature were held constant. These tests were completed with autoclave temperatures of 225, 200, 175 and 150° C. The results of these tests are given below:

| Test No. | Temperature °C. | Pressure, p. s. i. | Consumption [1] | | Recovery, percent |
|---|---|---|---|---|---|
| | | | NaCN | CaO | |
| 4 | 250 | 650 | 1.54 | 362.8 | 99.13 |
| 14 | 225 | 650 | 1.37 | 208.1 | 96.61 |
| 17 | 200 | 650 | 1.36 | 173.9 | 98.76 |
| 18 | 175 | 650 | 1.15 | 34.0 | 99.15 |
| 20 | 150 | 650 | 19.28 | 19.3 | 59.97 |

[1] Pounds per ton of concentrate.

EXAMPLE 16

Sample 6 was treated in the same series of treatments as Sample 2. Results of test work are given below:

Direct cyanidation

Gold recovery ------------------------ 17.69%.
NaCN consumption -------------------- 5.81 lb./ton.
CaO consumption --------------------- 24.18 lb./ton.

Roast-cyanidation of calcine

Gold recovery ------------------------ 71.18%.
NaCN consumption -------------------- 0.93 lb./ton.
CaO consumption --------------------- 14.77 lb./ton.

Acid oxidation-cyanidation

At 250° centigrade:
  Gold recovery ---------------------- 97.85%.
  NaCN consumption ------------------- 1.06 lb./ton.
  CaO consumption -------------------- 266.2 lb./ton.

At 175° centigrade:
  Gold recovery ---------------------- 95.14%.
  NaCN consumption ------------------- 0.83 lb./ton.
  CaO consumption -------------------- 30.0 lb./ton.

EXAMPLE 17

Sample 5 was treated in a manner similar to that of Example 15. Results of test work on this product are given below:

Direct cyanidation

Gold recovery ------------------------ 55.34%.
NaCN consumption -------------------- 24.12 lb./ton.
CaO consumption --------------------- 23.7 lb./ton.

Roast-cyanidation of calcine

Gold recovery ------------------------ 35.39%.
NaCN consumption -------------------- 4.42 lb./ton.
CaO consumption --------------------- 2.23 lb./ton.

Acid oxidation-cyanidation

| Test No. | Temperature °C. | Pressure, p. s. i. | Consumption [1] | | Recovery, percent |
|---|---|---|---|---|---|
| | | | NaCN | CaO | |
| 14 | 175 | 650 | 27.69 | 48.5 | 21.56 |
| 15 | 200 | 650 | 21.06 | 30.4 | 50.94 |
| 16 | 225 | 650 | 7.62 | 26.9 | 90.94 |
| 17 | 250 | 650 | 1.08 | 98.3 | 97.57 |

[1] Pounds per ton of concentrate.

The mine from which Samples 5 and 6 came produces approximately 12 times as much arsenical concentrate as antimony concentrate. When the two concentrates were mixed in that proportion and autoclaved at 175° C. relative complete destruction of the sulfide minerals was obtained with much lower lime consumption at the lower temperature. Results of these two tests are given below:

| Test No. | Temperature °C. | Pressure, p. s. i. | Consumption [1] | | Recovery, percent |
|---|---|---|---|---|---|
| | | | NaCN | CaO | |
| 20 | 200 | 650 | 0.93 | 264.3 | 95.47 |
| 21 | 175 | 650 | 1.61 | 61.6 | 97.83 |

[1] Pounds per ton of concentrate.

We claim:
1. A process of recovering locked precious metals from refractory source materials which comprises heating under pressure said source material in a slurry in an aqueous non-alkaline oxidizing medium to a temperature over 120° C., recovering from the said slurry the insoluble material, and recovering the precious metals from said insoluble material by cyanidation.

2. The process of claim 1 in which the aqueous medium is acid.

3. A process of recovering locked precious metals from refractory source materials which comprises heating under pressure said source material in a slurry in an aqueous acid medium in the presence of an excess of gaseous oxygen to a temperature over 120° C., recovering from the said slurry the insoluble material, and recovering the said precious metals from the said insoluble material by a cyanidation process.

4. The process according to claim 3 in which the gaseous oxygen is present as air.

5. A process of recovering precious metals chosen from the group consisting of silver and gold from refractory source materials, which comprises heating a slurry of said refractory source material in an aqueous acid medium in the presence of gaseous oxygen to a temperature over 120° C., recovering from the said slurry the insoluble material, and recovering the precious metals from the said insoluble material by cyanidation.

6. The process according to claim 5 in which the refractory source material is an ore containing arsenic.

7. The process according to claim 6 in which the source material contains arsenopyrite.

8. The process according to claim 5 in which the source material is a sulfide ore.

9. The process according to claim 8 in which the source material contains pyrite.

10. The process according to claim 5 in which the source material is a calcined ore.

11. The process according to claim 5 in which the source material contains tellurides.

12. The process according to claim 5 in which the source material contains antimony.

13. A process of recovering locked gold from arsenic containing ores, which comprises heating said ore in an aqueous acid medium in the presence of gaseous oxygen to a temperature of approximately 330° C., recovering from the said slurry the insoluble material, and recovering the gold from the said insoluble material by cyanidation.

14. The process according to claim 8 in which the precious metal is gold and the temperature of heating is approximately 330° C.

15. The process according to claim 10 in which the metal is gold, the temperature is approximately 330° C.

16. The process according to claim 11 in which the precious metal is gold, the temperature is approximately 330° C.

17. The process according to claim 12 in which the precious metal is gold, the temperature is approximately 330° C.

18. A process according to claim 1 in which the temperature at which the said refractory source material is heated with the said aqueous medium is between 150 and 250° C.

19. The process of claim 18 in which the temperature is between 165° and 185° C.

References Cited in the file of this patent
UNITED STATES PATENTS

| | | |
|---|---|---|
| 1,648,760 | Dietzsch | Nov. 8, 1927 |
| 2,686,114 | McGauley et al. | Aug. 10, 1954 |

FOREIGN PATENTS

| | | |
|---|---|---|
| 19,171 | Great Britain | of 1899 |